(12) United States Patent
Gou et al.

(10) Patent No.: US 11,587,330 B2
(45) Date of Patent: Feb. 21, 2023

(54) VISUAL ANALYTICS PLATFORM FOR UPDATING OBJECT DETECTION MODELS IN AUTONOMOUS DRIVING APPLICATIONS

(71) Applicant: Robert Bosch GmbH, Stuttgart (DE)

(72) Inventors: Liang Gou, San Jose, CA (US); Lincan Zou, San Jose, CA (US); Nanxiang Li, San Mateo, CA (US); Axel Wendt, Ostfildern (DE); Liu Ren, Saratoga, CA (US)

(73) Assignee: Robert Bosch GmbH, Stuttgart (DE)

( * ) Notice: Subject to any disclaimer, the term of this patent is extended or adjusted under 35 U.S.C. 154(b) by 481 days.

(21) Appl. No.: 16/731,470

(22) Filed: Dec. 31, 2019

(65) Prior Publication Data
US 2021/0201053 A1 Jul. 1, 2021

(51) Int. Cl.
| | |
|---|---|
| G06K 9/00 | (2022.01) |
| G06V 20/58 | (2022.01) |
| G06F 16/904 | (2019.01) |
| G06F 3/04842 | (2022.01) |
| G06F 16/58 | (2019.01) |

(Continued)

(52) U.S. Cl.
CPC .......... *G06V 20/58* (2022.01); *G05D 1/0088* (2013.01); *G06F 3/04842* (2013.01); *G06F 16/58* (2019.01); *G06F 16/904* (2019.01); *G06N 20/00* (2019.01); *G05D 2201/0213* (2013.01)

(58) Field of Classification Search
None
See application file for complete search history.

(56) References Cited

U.S. PATENT DOCUMENTS

| 10,691,943 | B1 * | 6/2020 | Ferstl | B64C 39/024 |
|---|---|---|---|---|
| 2019/0279005 | A1 * | 9/2019 | Ogale | B60R 1/00 |
| 2020/0394425 | A1 * | 12/2020 | Misra | G06K 9/6218 |

OTHER PUBLICATIONS

Everingham, M., Van Gool, L., Williams, C.K.I., Winn, J., Zisserman, A.:The PASCAL Visual Object Classes Challenge 2007 (VOC2007).

(Continued)

*Primary Examiner* — Wei Wen Yang
(74) *Attorney, Agent, or Firm* — Michael Best & Friedrich LLP

(57) ABSTRACT

Visual analytics tool for updating object detection models in autonomous driving applications. In one embodiment, an object detection model analysis system including a computer and an interface device. The interface device includes a display device. The computer includes an electronic processor that is configured to extract object information from image data with a first object detection model, extract characteristics of objects from metadata associated with image data, generate a summary of the object information and the characteristics, generate coordinated visualizations based on the summary and the characteristics, generate a recommendation graphical user interface element based on the coordinated visualizations and a first one or more user inputs, and update the first object detection model based at least in part on a classification of one or more individual objects as an actual weakness in the first object detection model to generate a second object detection model for autonomous driving.

20 Claims, 8 Drawing Sheets

(51) Int. Cl.
*G06N 20/00* (2019.01)
*G05D 1/00* (2006.01)

(56) References Cited

OTHER PUBLICATIONS

Lin Ty. et al. (2014) Microsoft COCO: Common Objects in Context. In: Fleet D., Pajdla T., Schiele B., Tuytelaars T. (eds) Computer Vision—ECCV 2014. ECCV 2014. Lecture Notes in Computer Science, vol. 8693. Springer, Cham.
Hoiem D., Chodpathumwan Y., Dai Q. (2012) Diagnosing Error in Object Detectors. In: Fitzgibbon A., Lazebnik S., Perona P., Sato Y., Schmid C. (eds) Computer Vision—ECCV 2012. ECCV 2012. Lecture Notes in Computer Science, vol. 7574. Springer, Berlin, Heidelberg.
Yang, Y., Hallman, S., Ramanan, D., Fowlkes, C.: Layered object detection for multi-class segmentation. In: CVPR. (2010).
Felzenszwalb, P., Girshick, R., McAllester, D., Ramanan, D.: Object detection with discriminatively trained part based models. PAMI (2009).
Sun, M., Su, H., Savarese, S., Fei-Fei, L.: A multi-view probabilistic model for 3d object classes. In: CVPR. (2009).

\* cited by examiner

VISUAL ANALYTICS PLATFORM FOR UPDATING OBJECT DETECTION MODELS IN AUTONOMOUS DRIVING APPLICATIONS

FIELD

The present disclosure relates generally to a visual analytics platform for object detection models. More specifically, the present disclosure relates to a visual analytics platform for object detection models in autonomous driving applications.

BACKGROUND

Object detection is an important component in autonomous driving. It is also appropriate to evaluate and analyze the performance of object detection models that are implemented by one or more electronic processors to perform the objection detection in autonomous driving.

A metric of mean Average Precision (referred to herein as "mAP") has been used to evaluate the accuracy of object detection models. The metric mAP is usually aggregated over multiple cases with all object categories and different thresholds of Intersection over Union values (referred to herein as "IoU values") that measure the overlapping areas between the bounding boxes of ground truth and prediction. The metric mAP provides a quantitative measure of the model performance by the object detection model and provides a comparison between different object detection models.

SUMMARY

However, as a single and aggregated metric, the metric mAP does not provide context or detail other than a high-level value of model performance. There are many factors that may impact the model performance, such as object categories, size, image background, or other suitable factors. Without context or detail regarding the various factors that are directly impacting the model performance, root causes of errors in object detection models are hard to trace. Consequently, improving model performance of object detection models is difficult because the root causes of errors are likely unknown and hard to trace.

Among others, conventional evaluation methods and tools still face the following challenges 1) an aggregated metric of mAP without considering the contextual info of object characters, 2) no set of intuitive mechanisms to understand overall characteristics of the datasets and model performance, 3) no interactive exploration and navigation tool to analyze the model performance with customized context, and 4) a lot of manual effort required to navigate and narrow down the root causes. To address these challenges, the present disclosure includes, among other things, a visual analytics platform with coordinated visualizations to conduct multi-faceted performance analysis for object detection models in autonomous driving applications.

For example, in one embodiment, the present disclosure includes an object detection model analysis system. The object detection model analysis system includes a computer and an interface device. The interface device includes a display device. The computer includes a communication interface configured to communicate with the interface device, a memory including an object detection model visual analysis platform and a first object detection model for autonomous driving, and an electronic processor communicatively connected to the memory. The electronic processor is configured to extract object information from image data with the first object detection model, extract characteristics of objects from metadata associated with the image data, generate a summary of the object information and the characteristics that are extracted, generate coordinated visualizations based on the summary and the characteristics that are extracted, output the coordinated visualizations for display on the display device, receive a first one or more user inputs selecting a portion of information that is included in the coordinated visualizations, generate a recommendation graphical user interface element based on the coordinated visualizations and the first one or more user inputs, the recommendation graphical user interface element summarizing one or more potential weaknesses of the first object detection model, output the recommendation graphical user interface element for display on the display device, receive a second user input selecting one or more individual objects from the object information that is extracted and included in the one or more potential weaknesses, output an image based on the image data and the second user input, the image highlighting the one or more individual objects, receive a third user input classifying the one or more individual objects as an actual weakness with respect to the first object detection model, and update the first object detection model based at least in part on the classification of the one or more individual objects as the actual weakness with respect to the first object detection model to generate a second object detection model for autonomous driving.

Additionally, in another embodiment, the present disclosure includes a method for updating an object detection model for autonomous driving with an object detection model visual analysis platform. The method includes extracting, with an electronic processor and a first object detection model for autonomous driving, object information from image data. The method includes extracting, with the electronic processor, characteristics of objects from metadata associated with the image data. The method includes generating, with the electronic processor, a summary of the object information and the characteristics that are extracted. The method includes generating, with the electronic processor, coordinated visualizations based on the summary and the characteristics that are extracted. The method includes outputting, with the electronic processor, the coordinated visualizations for display on a display device. The method includes receiving, with the electronic processor, a first one or more user inputs from an interface device via a communication interface, the first one or more user inputs selecting a portion of information that is included in the coordinated visualizations. The method includes generating, with the electronic processor, a recommendation graphical user interface element based on the coordinated visualizations and the first one or more user inputs, the recommendation graphical user interface element summarizing one or more potential weaknesses of the first object detection model. The method includes outputting, with the electronic processor, the recommendation graphical user interface element for display on the display device. The method includes receiving, with the electronic processor, a second user input selecting one or more individual objects from the object information that is extracted and included in the one or more potential weaknesses. The method includes outputting, with the electronic processor, an image based on the image data and the second user input for display on the display device, the image highlighting the one or more individual objects. The method includes receiving, with the electronic processor, a third user input classifying the one or more individual objects as an actual weakness with respect to the first object detection model. The method also includes updating, with the electronic processor, the first object detection model based at least in part on the classification of the one or more individual objects as the actual weakness with respect to the first object detection model to generate a second object detection model for autonomous driving.

Additionally, in yet another embodiment, the present disclosure includes a non-transitory computer-readable medium comprising instructions that, when executed by an electronic processor, causes the electronic processor to perform a set of operations. The set of operations includes extracting object information from image data with a first object detection model for autonomous driving. The set of operations includes extracting characteristics of objects from metadata associated with the image data. The set of operations includes generating a summary of the object information and the characteristics that are extracted. The set of operations includes generating coordinated visualizations based on the summary and the characteristics that are extracted. The set of operations includes outputting the coordinated visualizations for display on a display device. The set of operations includes receiving a first one or more user inputs from an interface device via a communication interface, the first one or more user inputs selecting a portion of information that is included in the coordinated visualizations. The set of operations includes generating a recommendation graphical user interface element based on the coordinated visualizations and the first one or more user inputs, the recommendation graphical user interface element summarizing one or more potential weaknesses of the first object detection model. The set of operations includes outputting the recommendation graphical user interface element for display on the display device. The set of operations includes receiving a second user input selecting one or more individual objects from the object information that is extracted and included in the one or more potential weaknesses. The set of operations includes outputting an image based on the image data and the second user input for display on the display device, the image highlighting the one or more individual objects. The set of operations includes receiving a third user input classifying the one or more individual objects as an actual weakness with respect to the first object detection model. The set of operations includes updating the first object detection model based at least in part on the classification of the one or more individual objects as the actual weakness with respect to the first object detection model to generate a second object detection model for autonomous driving. Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "computers" and "interface devices" described in the specification can include one or more processing units, one or more computer-readable medium modules, one or more input/output interfaces, and various connections (e.g., a system bus) connecting the components together. It should also be understood that although certain embodiments depict components as logically separate, such depiction is merely for illustrative purposes. In some embodiments, the illustrated components may be combined or divided into separate software, firmware and/or hardware. Regardless of how they are combined or divided, these components may be executed or located on the same computing device or may be distributed among different computing devices connected by one or more networks or other suitable connections.

Other aspects of various embodiments will become apparent by consideration of the detailed description and accompanying drawings.

DETAILED DESCRIPTION OF EXEMPLARY EMBODIMENTS

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Figure 1:
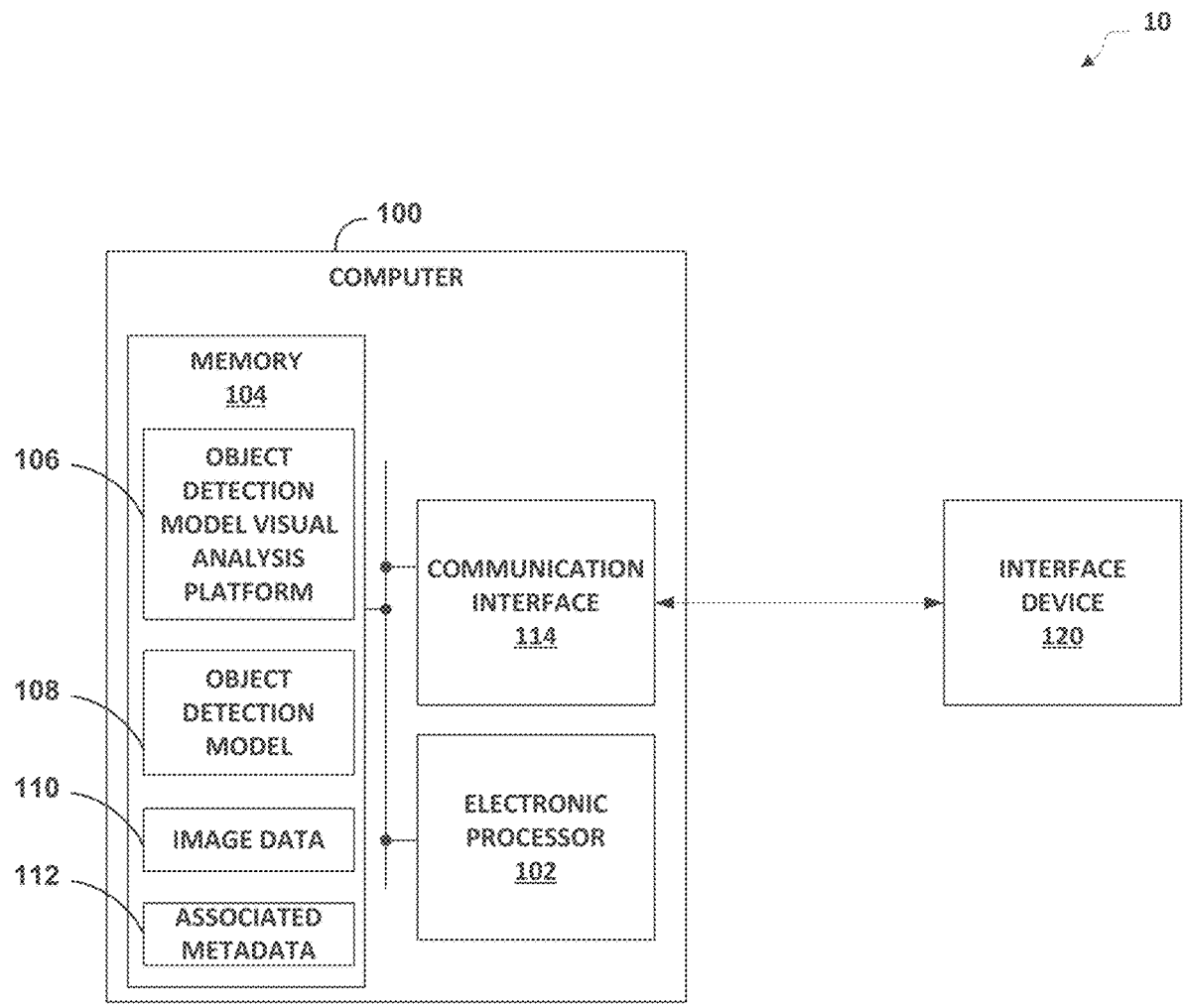
FIG. 1 is a block diagram illustrating an object detection model analysis system, in accordance with various aspects of the present disclosure.

FIG. 1 is a block diagram illustrating an object detection model visual analysis system 10. In the example of FIG. 1, the object detection visual analysis system 10 includes a computer 100 and an interface device 120. The interface device 120 includes a display device and may be a personal desktop computer, a laptop computer, a tablet computer, a personal digital assistant, a mobile phone, or other suitable computing device.

However, it should be understood that, in some embodiments, there are different configurations from the configuration illustrated in FIG. 1. For example, the functionality described herein with respect to the computer 100 may be extended to a different number of computers providing distributed processing. Additionally, the functions described herein with respect to the computer 100 may be implemented solely by the interface device 120, such that the "cloud-type" system described in FIG. 1 is also applicable to a "personal computing" system.

The computer 100 includes an electronic processor 102 (for example, a microprocessor or another suitable processing device), a memory 104 (for example, a non-transitory computer-readable storage medium), and a communication interface 114. It should be understood that, in some embodiments, the computer 100 may include fewer or additional components in configurations different from that illustrated in FIG. 1. Also the computer 100 may perform additional functionality than the functionality described herein. In addition, the functionality of the computer 100 may be incorporated into other computers. As illustrated in FIG. 1, the electronic processor 102, the memory 104, and the communication interface 114 are electrically coupled by one or more control or data buses enabling communication between the components.

In one example, the electronic processor 102 executes machine-readable instructions stored in the memory 104. For example, the electronic processor 102 may execute instructions stored in the memory 104 to perform the functionality described herein.

The memory 104 may include a program storage area (for example, read only memory (ROM)) and a data storage area (for example, random access memory (RAM), and other non-transitory, machine-readable medium). In some examples, the program storage area may store the instructions regarding an object detection model visual analysis platform 106 (also referred to as "object detection model visual analysis tool 106") and an object detection model 108. Additionally, in some examples, the data storage area may store image data 110 and metadata 112 that is associated with the image data 110.

Figure 2:
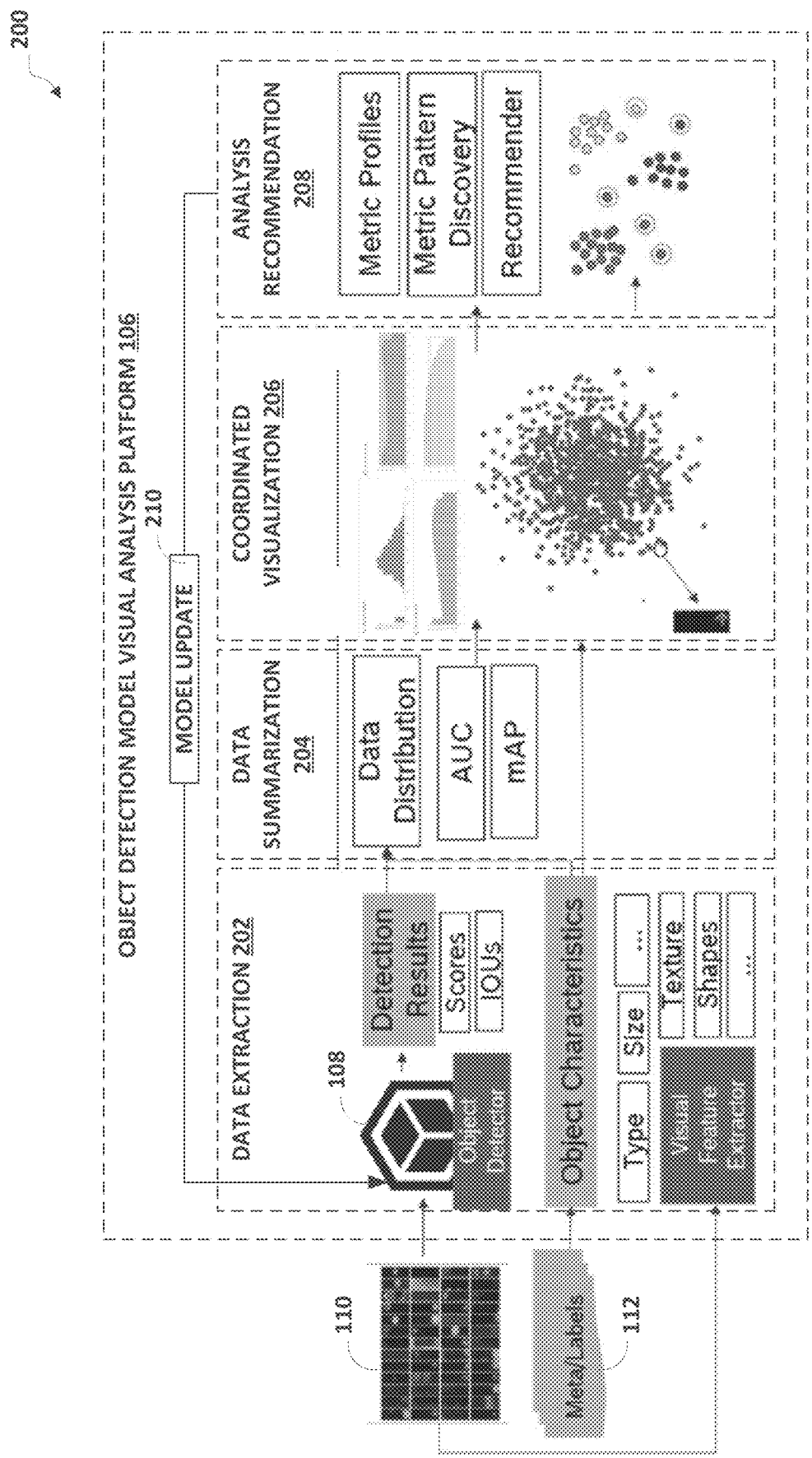
FIG. 2 is a diagram illustrating a workflow of various components in the object detection model visual analysis platform of FIG. 1, in accordance with various aspects of the present disclosure.

The object detection model visual analysis tool 106 has machine-readable instructions that cause the electronic processor 102 to process (e.g., retrieve) the image data 110 and associated metadata 112 from the memory 104 with the object detection model 108 and generate different visualizations based on the image data 110 and the associated metadata 112. In particular, the electronic processor 102, in processing the image data 110 and the associated metadata 112 with the object detection model 108 (e.g., as illustrated in FIG. 2 below), uses machine learning to generate and output developer insights, data visualization, and enhancement recommendations for the object detection model 108.

Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using one or more of the approaches described above, a computer program can ingest, parse, and understand data and progressively refine algorithms for data analytics.

The communication interface 114 receives data from and provides data to devices external to the computer 100, such as the interface device 120. For example, the communication interface 114 may include a port or connection for receiving a wired connection (for example, an Ethernet cable, fiber optic cable, a telephone cable, or the like), a wireless transceiver, or a combination thereof. In some examples, the communication interface 114 may communicate with the interface device 120 via the internet.

In some examples, the computer 100 includes one or more graphical user interfaces (as described in greater detail below and illustrated in FIGS. 2-6) and one or more user interfaces (not shown). The one or more graphical user interfaces (e.g., one or more webpages) including graphical elements that allow a user of the interface device 120 to interface with the computer 100. The one or more graphical user interfaces may include, or be part of, a display screen that displays the developer insights, data visualization, and enhancement recommendations and output by the electronic processor 102 from performing the object detection model visual analysis tool 106.

In some examples, the computer 100 includes one or more user interfaces (not shown). The one or more user interfaces include one or more input mechanisms (for example, a touch screen, a keypad, a button, a knob, and the like), one or more output mechanisms (for example, a display, a printer, a speaker, and the like), or a combination thereof. The one or more optional user interfaces receive input from a user, provide output to a user, or a combination thereof. In some embodiments, as an alternative to or in addition to managing inputs and outputs through the one or more optional user interfaces, the computer 100 may receive user input, provide user output, or both by communicating with an external device (e.g., the interface device 120 or a workstation (not shown)) over a wired or wireless connection.

FIG. 2 is a diagram illustrating a workflow 200 of various components 202-210 in the object detection model visual analysis tool 106 of FIG. 1. In the example of FIG. 2, the object detection model visual analysis tool 106 includes a data extraction component 202, a data summarization component 204, a coordinated visualization component 206, and an analysis recommendation component 208 that assesses the object detection model 108 of FIG. 1, and a model update component 210 that updates the object detection model 108 of FIG. 1.

In the example of FIG. 2, the object detection model visualization analysis tool 106 uses the object detection model 108 of FIG. 1 to detect traffic lights in the image data 110. As illustrated in FIG. 2, the data extraction component 202 extracts the object characteristics and model performance metrics from datasets (e.g., the image data 110 and the associated metadata 112) and one or more object detection models (e.g., the object detection model 108). The data summarization component 204 summarizes the characteristics of these datasets. The coordinated visualization component 206 represents the data summarization with a set of coordinated interactive visualizations that enables an interactive analysis of the relationship among different metrics.

Lastly, the analysis recommendation component 208 recommends important error patterns based on a user's interests. The workflow 200 starts with data sources including object images 110 (e.g. driving scenes with traffic lights) and associated metadata 112 (e.g., labels including classification info, bounding box, or other suitable metadata). In summary, the object detection model visualization analysis tool 106 has four components: a data extraction component 202, a data (metrics and metadata) summarization component 204, a coordinated visualization component 206, and an analysis recommendation component 208.

As illustrated with respect to the data extraction component 202, there are two types of data that are extracted to understand the impact of an object's characteristics over the model performance. The first type of data that is extracted is an object's characteristics. The object's characteristics is descriptive information including object types (e.g., green, yellow, red lights, arrows, other suitable object types), object sizes, aspect ratios (which may be derived from the bounding box information), and occlusion. The object's characteristics may be extracted from the associated metadata 112. Furthermore, complicated visual features in the image data 110 may also extracted with feature extractors, e.g., feature maps from deep convolutional neural networks, which is referred to as the "visual feature extractor."

The second type of data that is extracted is detection results. The detection results may include detection boxes, detection classes, and detection scores. The detection results may be obtained from the inference results from the object detection model 108 by using the images data 110 as the inputs. With the ground truth and detection bounding boxes, the object detection model 108 may also calculate the IoU values.

As illustrated with respect to the data summarization component 204, the data summarization component 204 summarizes the data distribution of both object characteristics and detection metrics (e.g., IoUs and confidence scores). The data summarization component 204 also calculates the area-under-curve (AUC) scores based on user's selection with interaction the coordinated visualizations as described in greater detail below.

Figure 3:
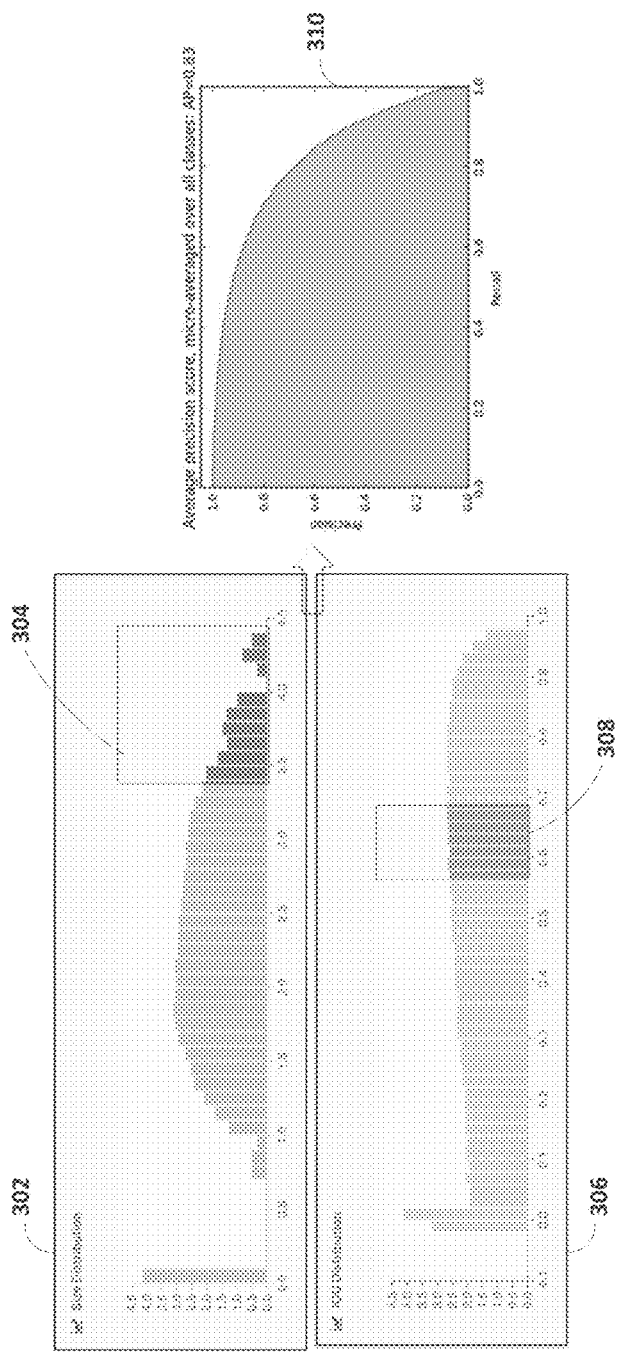
FIG. 3 is a diagram illustrating a size distribution visualization with a first user input selection, a IoU distribution visualization with a second user input selection, and an area-under-curve (AUC) scores visualization, in accordance with various aspects of the present disclosure.

As illustrated with respect to the coordinated visualization component 206, the coordinated visualization component 206 is a set of visualizations generated from the data summarization. For example, FIG. 3 is a diagram illustrating a size distribution visualization 302 with a first user input selection 304 and a IoU distribution visualization 306 with a second user input selection 308, and an area-under-curve (AUC) scores visualization 310. As illustrated in FIG. 3, the first user input selection 304 selects a size range between 3.5 and 4.5 and the second user input selection 308 selects the IoU range between roughly 0.6 and 0.7, and the AUC scores visualization 310 regarding large size objects is then calculated by the data summarization component 204 and displayed by the coordinated visualization component 206.

By calculating the AUC scores after selecting a size range and an IoU range, the data summarization component 204 and the coordinated visualization component 206 provide the user a contextualized AUC. Conventionally, a contextualized AUC is not feasible because the mAP metrics are aggregated by averaging the AUC over many IOU ranges.

Additionally, the set of coordinated visualizations may include distribution of object classes and sizes, and detection metrics of IoUs and scores to allow the user to interactively select the objects of interest, and understand the relationship among the metrics of interest. Specifically, the impact of different object characteristics over the IoU scores, or how the IoU scores are correlated to the confident scores. A scatter plot visualization of all objects is provided to reveal the overall patterns among object characteristics and model performance metrics. Each object is assigned to a position in the two-dimensional scatter plot by the dimension reduction results of its multivariate values of the object characteristics and detection results. A dimension reduction may be used here, such as PCA, MDS, t-SNET or other suitable dimension reduction technique.

As illustrated with respect to the analysis recommendation component 208, the analysis recommendation component 208, when executed by the electronic processor 102, generates a graphical user interface element that identifies at least one of strengths or weaknesses of the object detection model 108 that the user may investigate with minimal manual exploration. Additionally, as illustrated in FIG. 2, the analysis recommendation component 208 includes three sub-components 1) metric profiles, 2) clustering, and 3) an analysis recommender.

With respect to metric profiles, the analysis recommendation component 208 has predefined metric profiles, including false alarms (zero size objects without ground truth bounding boxes but having medium to high confidence scores), mislabeled data (zero size objects with very high confidence scores), and other suitable predefined metric profiles. In some embodiments, a user of the object detection model visualization analysis tool 106 may also define their own metric profiles of interest, such as a large size with small IoUs, small size with large IoUs, or other suitable metric profiles of interest.

With respect to clustering, the analysis recommendation component 208 has metric pattern discovery to help a user identify useful performance metric patterns among all objects by clustering objects' object characteristics and model metrics together. Lastly, with respect to analysis recommender, the analysis recommendation component 208 may summarize the features in the clusters and navigate the user to the clusters of interest. To summarize the clusters, the analysis recommendation component 208 may use feature selection methods to highlight the features of highest priority to a user of the object detection model visual analytics tool 106.

Figure 4:
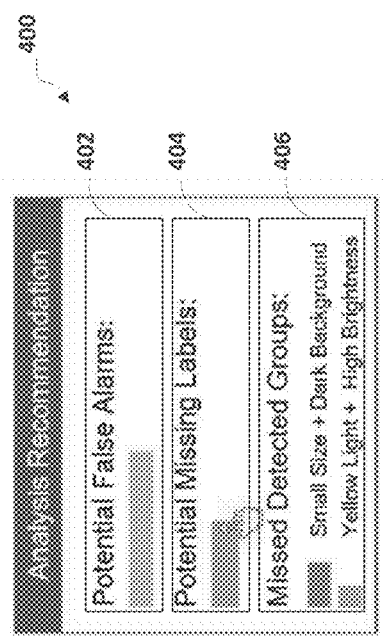
FIG. 4 is a block diagram illustrating an exemplary embodiment of an analysis recommendation graphical user interface (GUI) element with respect to an object detection model, in accordance with various aspects of the present disclosure.

For example, FIG. 4 is a block diagram illustrating an exemplary embodiment of an analysis recommendation graphical user interface (GUI) element 400 with respect to the object detection model 108 that identifies three weaknesses: a number of potential false alarms section 402, a number of potential missing labels section 404, and a missed detected groups section 406. The missed detected groups section 406 further includes a first sub-section dedicated to small size and dark background of the objects with low IOUs and a second sub-section dedicated to yellow light and high brightness. In this way, the sections 402-406 of the analysis recommendation GUI element 400 allow a user to quickly locate these objects in the two-dimensional scatter plot visualization and allow for further analysis without manual exploration by the user of every single detected object.

Figure 5:
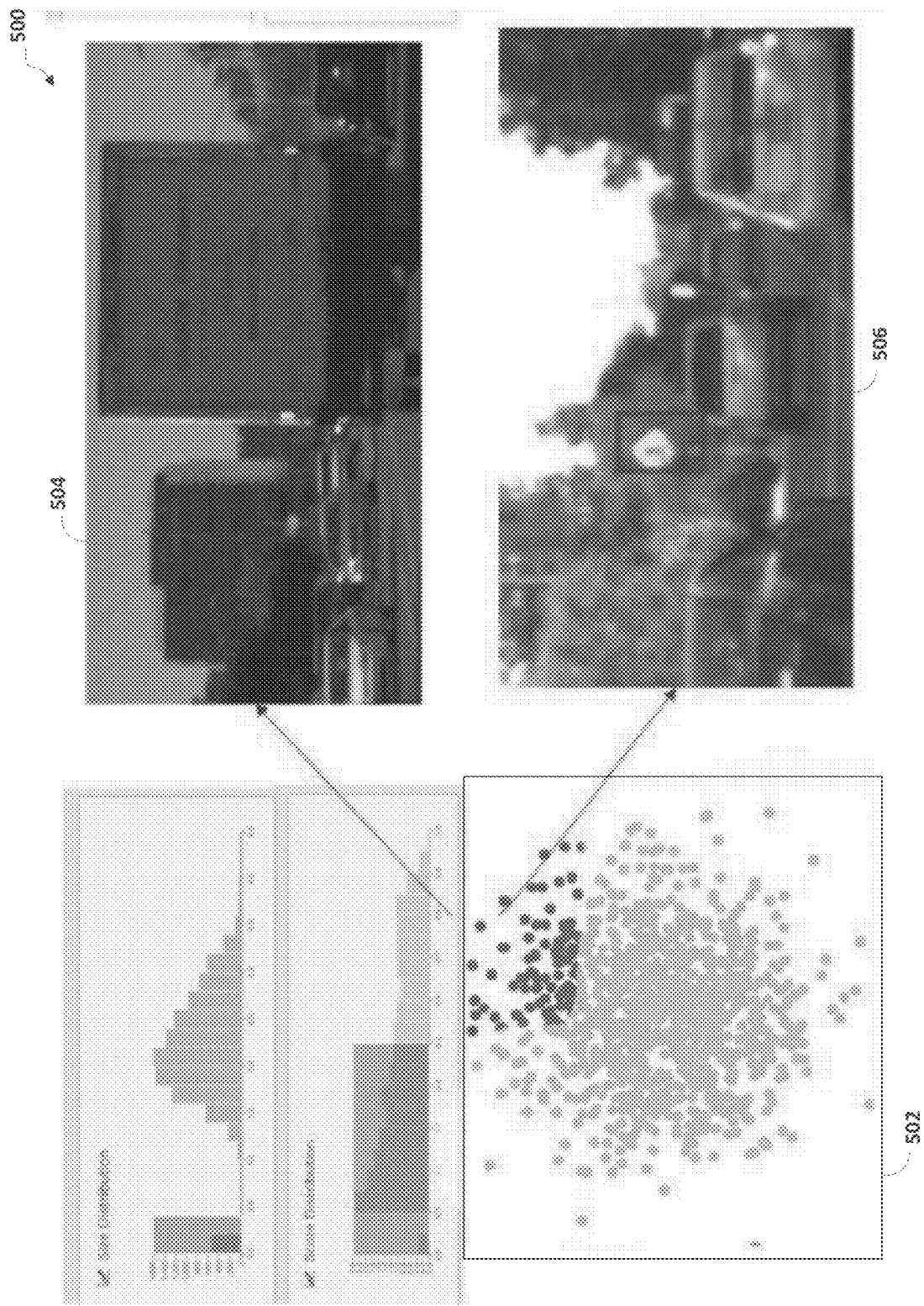
FIGS. 5 and 6 are diagrams illustrating two different analyses of the object detection model, in accordance with various aspects of the present disclosure.
Figure 6:
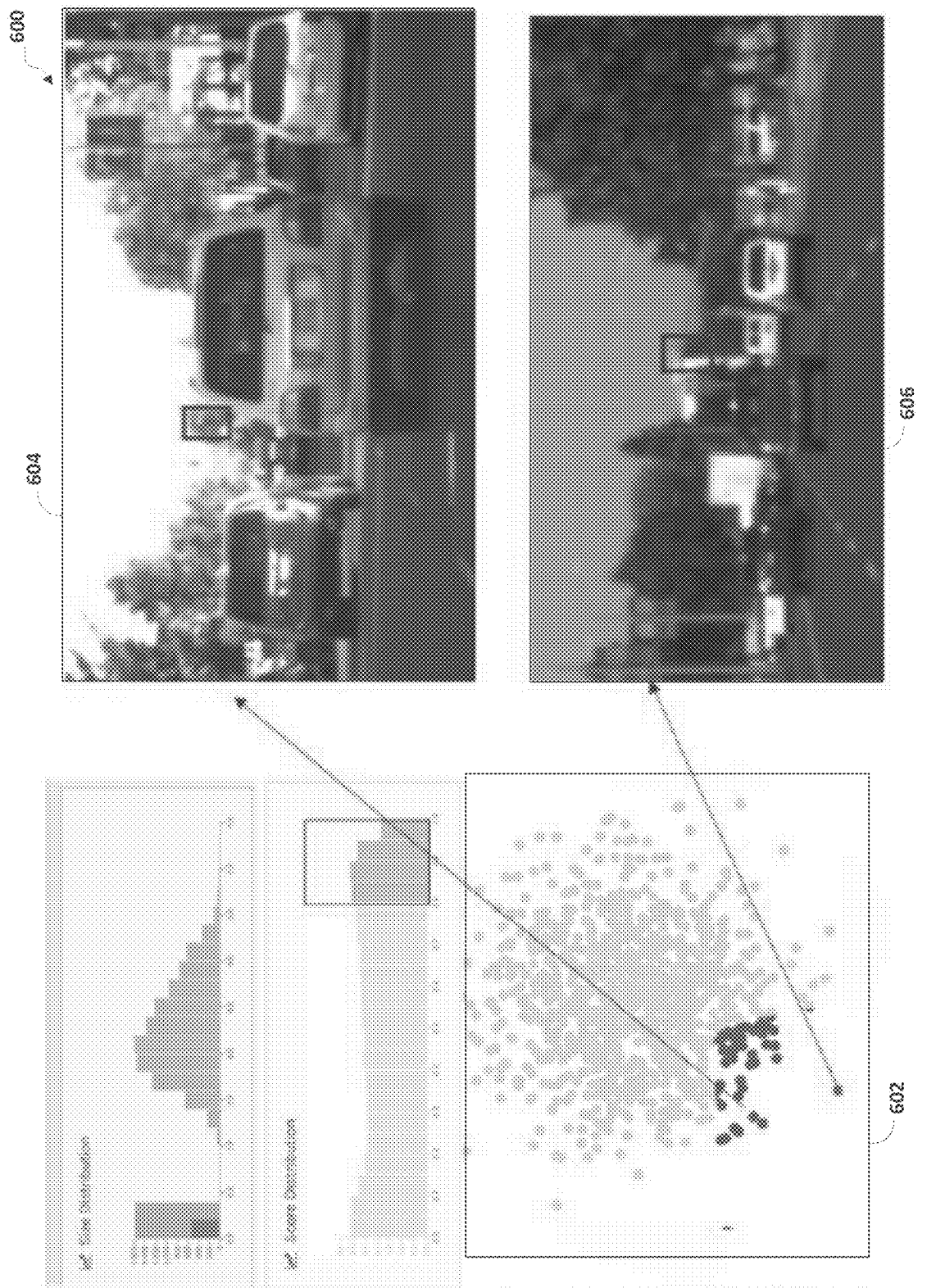

For example, FIGS. 5 and 6 are diagrams illustrating two different analyses 500 and 600 of the object detection model 108. The analysis 500 is connected to the potential false alarms section 402 of the analysis recommendation GUI element 400 and allows a user to drill down into segments of the two-dimensional scatter plot 502 to locate one type of model error in the object detection model 108, specifically, false positives (e.g., images 504 and 506). The analysis 600 is connected to the potential missing labels section 404 of the analysis recommendation GUI element 400 and allows a user to drill down into segments of the two-dimensional scatter plot 602 to locate another type of model error in the object detection model 108, specifically, data with missing labels (e.g., images 604 and 606). Put simply, the analysis recommendation GUI element 400 provides a user a means to analyze segments of the two-dimensional scatter plot visualization (i.e., the two-dimensional scatter plots 502 and 602, respectively) to address deficiencies in the object detection model 108.

With respect to the model update component 210, after the user analyzes segments of the two-dimensional scatter plot to address deficiencies in the object detection model 108, the user may identify whether the deficiencies in the object detection model 108 exist and how the deficiencies should be classified.

Upon classification of some or all of the deficiencies highlighted by the analysis recommendation GUI element 400, the model update component 210, when executed by the electronic processor 102, updates the object detection model 108 to generate a second object detection model that does not include the deficiencies identified in the object detection model 108. Put simply, the model update component 210 provides a user a means to update the object detection model 108 to generate a new object detection model after some or all of the deficiencies in the object detection model 108 have been addressed by the user's use of the analysis recommendation GUI element 400 as illustrated in FIGS. 4-6.

Figure 7A:
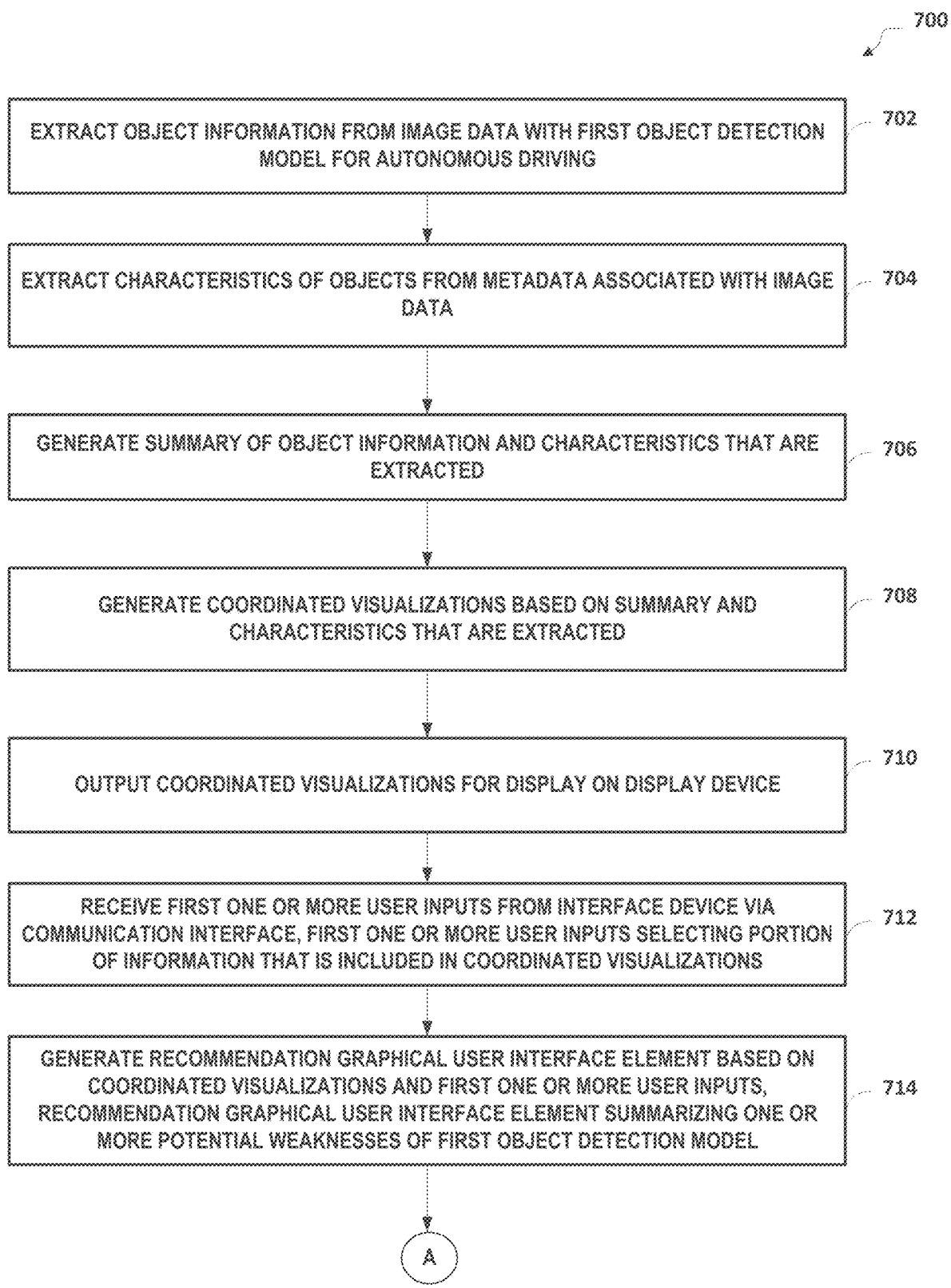
FIGS. 7A and 7B are flowcharts illustrating an exemplary method 700 performed by the object detection model visual analysis system 10 of FIG. 1, in accordance with various aspects of the present disclosure.
Figure 7B:
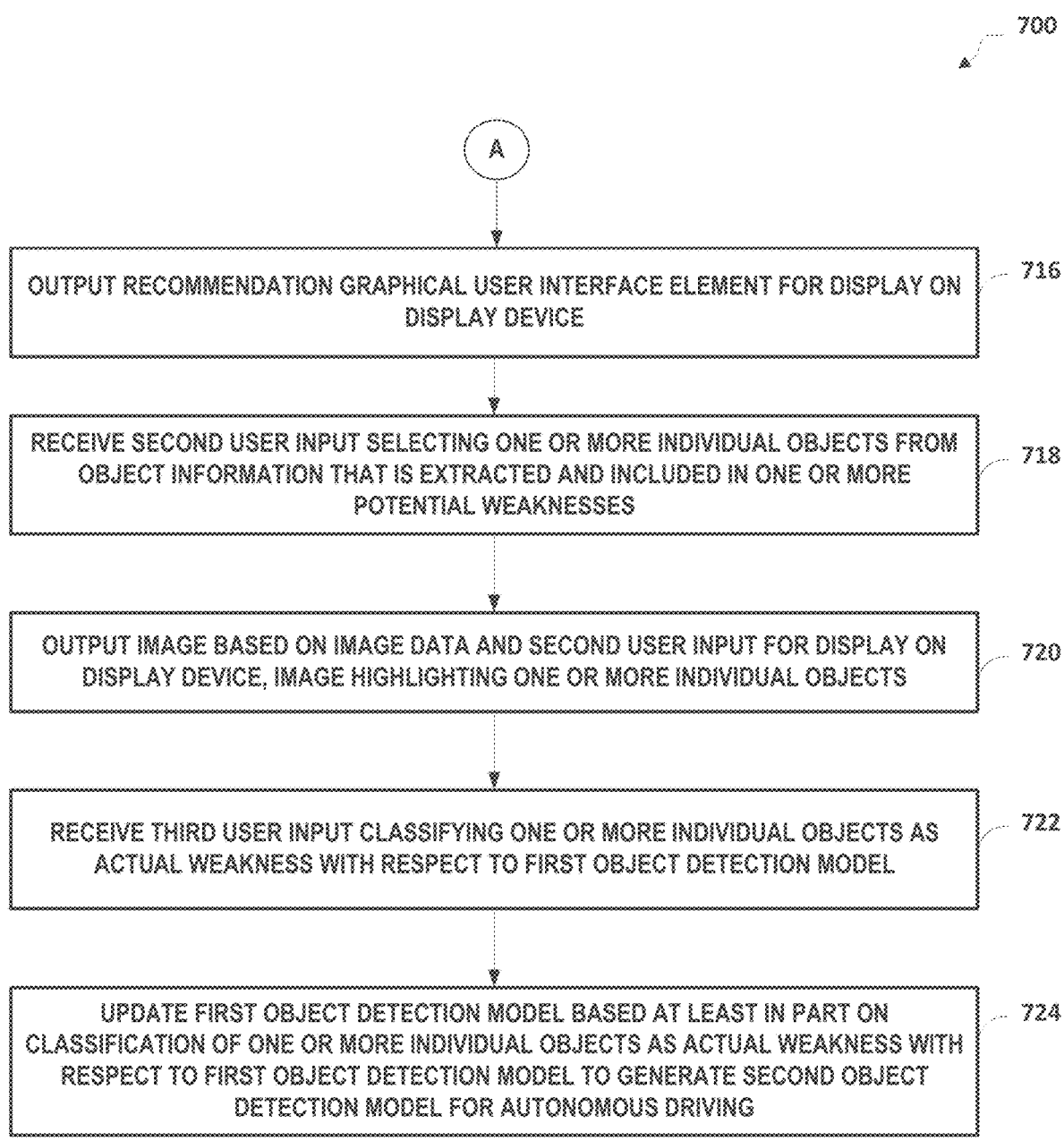

FIGS. 7A and 7B are flowcharts illustrating an exemplary method 700 performed by the object detection model visual analysis system 10 of FIG. 1. FIG. 7 is described with respect to FIGS. 1-6.

In the example of FIG. 7, the method 700 includes the electronic processor 102 of the computer 100 extracting object information from image data with a first object detection model for autonomous driving (at block 702). For example, the electronic processor 102 of the computer 100 extracts object information from image data 110 with the object detection model 108 for autonomous driving.

The method 700 includes the electronic processor 102 extracting characteristics of objects from metadata associated with the image data (at block 704). For example, the electronic processor 102 extracts characteristics of objects from associated metadata 112 associated with the image data 110 as part of the data extraction component 202 of FIG. 2.

The method 700 includes the electronic processor 102 generating a summary of the object information and the characteristics that are extracted (at block 706). For example, the electronic processor 102 generates the data distribution, area-under-curve (AUC) values, and mAP values as part of the data summarization component 204 of FIG. 2.

The method 700 includes the electronic processor 102 generating coordinated visualizations based on the summary and the characteristics that are extracted (at block 708). The method 700 includes the electronic processor 102 outputting the coordinated visualizations for display on a display device (at block 710). For example, the electronic processor 102 generates and outputs the coordinated visualizations as part of the coordinated visualization component 206 of FIG. 2.

The method 700 includes the electronic processor 102 receiving a first one or more user inputs from an interface device via a communication interface, the first one or more user inputs selecting a portion of information that is included in the coordinated visualizations (at block 712). For example, the electronic processor 102 receives a first one or more user inputs from the interface device 120 via the communication interface 114, and the first one or more user inputs includes the first user input 304 and the second user input 308 of FIG. 3.

The method 700 includes the electronic processor 102 generating a recommendation graphical user interface element based on the coordinated visualizations and the first one or more user inputs, the recommendation graphical user interface element summarizing one or more potential weaknesses of the first object detection model (at block 714). The method 700 includes the electronic processor 102 outputting the recommendation graphical user interface element for display on the display device (at block 716). For example, the electronic processor 102 generates and outputs the recommendation graphical user interface element 400 of FIG. 4.

The method 700 includes the electronic processor 102 receiving a second user input selecting one or more individual objects from the object information that is extracted and included in the one or more potential weaknesses (at block 718). For example, the second user input is a selection of one of the potential false alarms section 402, the potential missing labels section 404, or the missed detected groups section 406 of FIG. 4, and the selection of one or more individual objects in a two-dimensional scatterplot (i.e., two-dimensional scatterplots 502 or 602 of FIGS. 5 and 6).

The method 700 includes the electronic processor 102 outputting an image based on the image data and the second user input for display on the display device, the image highlighting the one or more individual objects (at block 720). For example, the electronic processor 102 outputs images 504 and 506 highlighting the individual objects selected in the two-dimensional scatterplot 502 as illustrated in FIG. 5. Alternatively, for example, the electronic processor 102 outputs images 604 and 606 highlighting the individual objects selected in the two-dimensional scatterplot 602 as illustrated in FIG. 6.

The method 700 includes the electronic processor 102 receiving a third user input classifying the one or more individual objects as an actual weakness with respect to the first object detection model (at block 722). For example, the electronic processor 102 receives a third user input classifying the one or more individual objects in the two-dimensional scatterplot 502 as false positives in the object detection model 108. Alternatively, for example, the electronic processor 102 receives a third user input classifying the one or more individual objects in the two-dimensional scatterplot 602 as missing data labels in the object detection model 108.

The method 700 also includes the electronic processor 102 updating the first object detection model based at least in part on the classification of the one or more individual objects as the actual weakness with respect to the first object detection model to generate a second object detection model for autonomous driving (at block 724). For example, the electronic processor 102 updates the object detection model 108 based at least in part on the false positives or the missing data labels identified in the third user input to generate a second object detection model for autonomous driving that excludes the deficiencies identified in the object detection model 108 and increases the object detection performance of the second object detection model over the object detection model 108.

In some embodiments, the method 700 may further include extracting visual features based on the image data and generating the coordinated visualizations based on the summary and the visual features that are extracted. In these embodiments, the visual features may include a feature type, a feature size, a feature texture, and a feature shape.

In some embodiments, the coordinated visualizations may include a size distribution visualization, an IoU distribution visualization, an Area Under Curve (AUC) visualization, a score distribution, and a class distribution. In these embodiments, when the first one or more user inputs includes a size range input to the size distribution visualization and an IoU value range input to the IoU distribution visualization, the AUC visualization may be based on the size range input and the IoU value range input.

In some embodiments, one individual object of the one or more individual objects is one example weakness of the one or more potential weaknesses of the first object detection model. In some embodiments, the object information may include detection results, scores, and Intersection over Union (IoU) values.

Figure 8:
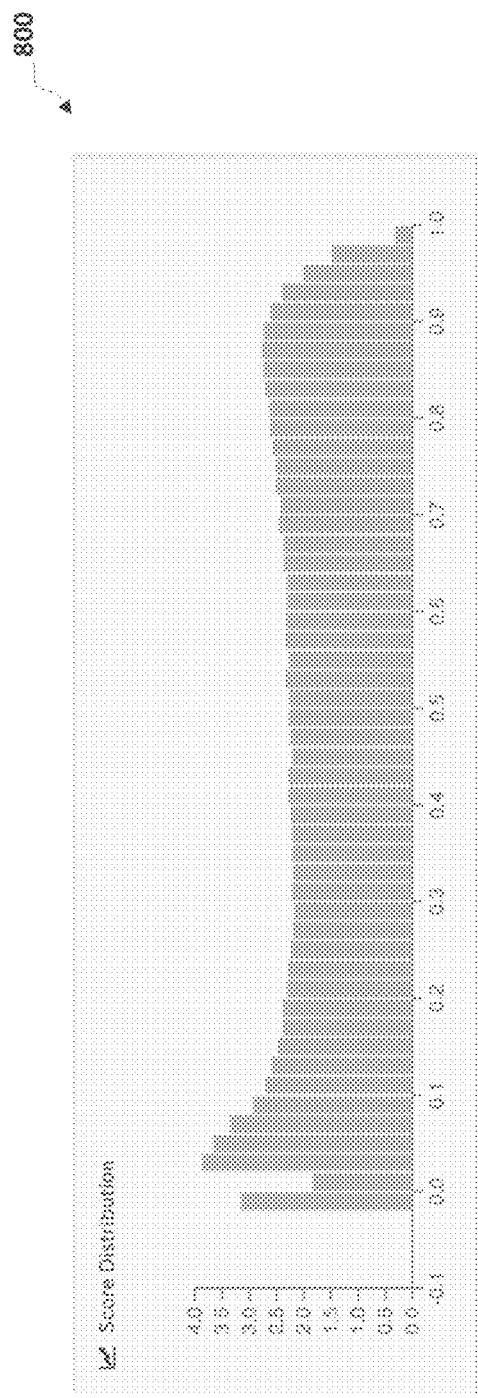
FIG. 8 is a diagram illustrating a score distribution visualization, in accordance with various aspects of the present disclosure.

FIG. 8 is a diagram illustrating a score distribution visualization 800. The score distribution visualization 800 is part of the coordinated visualizations described above. In example of FIG. 8, the score distribution visualization 800 illustrates the distribution of mAP scores from 0.0 to 1.0 for all of the objects detected in the image data 110. A user may select a range of the mAP scores to further analyze detected objects that fall in the range of mAP scores with respect to the object detection model 108.

Figure 9:
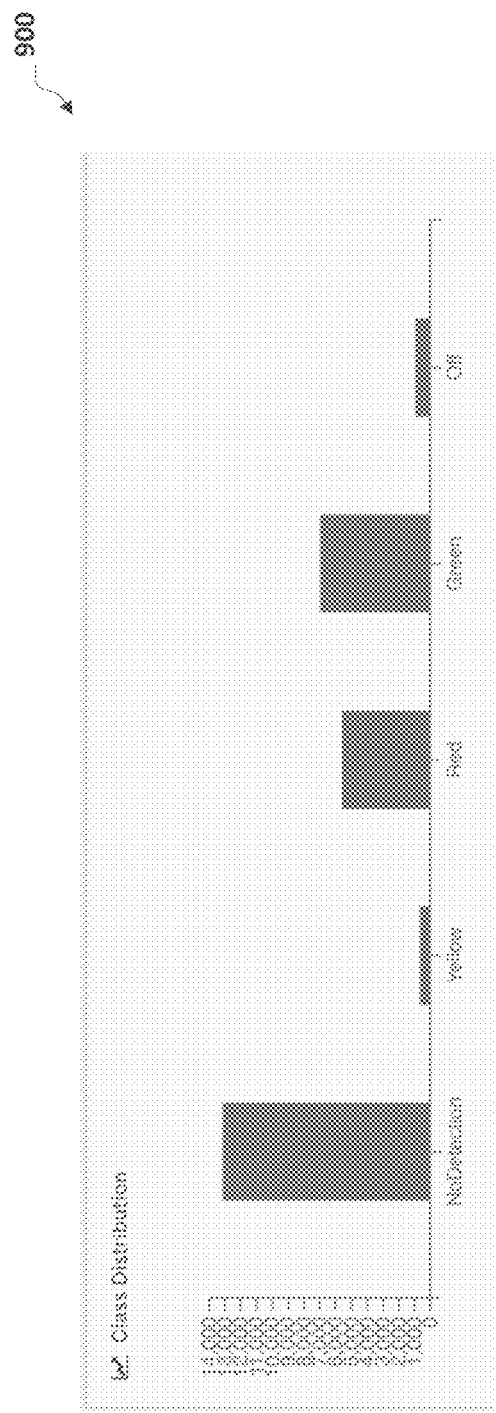
FIG. 9 is a diagram illustrating class distribution visualization, in accordance with various aspects of the present disclosure.

FIG. 9 is a diagram illustrating class distribution visualization 900. The class distribution visualization 900 is also part of the coordinated visualizations described above. In example of FIG. 9, the class distribution visualization 900 illustrates the distribution of classifier for all of the objects detected in the image data 110. In particular, the class distribution visualization 900 includes a no detection classifier, a yellow classifier, a red classifier, a green classifier, and an off classifier. A user may select one or more classifiers to further analyze detected objects that were classified within the one or more classifiers.

The following examples illustrate example systems, methods, and non-transitory computer-readable media described herein.

Example 1: an object detection model visual analysis system comprising an interface device including a display device; and a computer including a communication interface configured to communicate with the interface device; a memory including an object detection model visual analysis platform and a first object detection model for autonomous driving; and an electronic processor communicatively connected to the memory, the electronic processor is configured to extract object information from image data with the first object detection model, extract characteristics of objects from metadata associated with the image data, generate a summary of the object information and the characteristics that are extracted, generate coordinated visualizations based on the summary and the characteristics that are extracted, output the coordinated visualizations for display on the display device, receive a first one or more user inputs selecting a portion of information that is included in the coordinated visualizations, generate a recommendation graphical user interface element based on the coordinated visualizations and the first one or more user inputs, the recommendation graphical user interface element summarizing one or more potential weaknesses of the first object detection model, output the recommendation graphical user interface element for display on the display device, receive a second user input selecting one or more individual objects from the object information that is extracted and included in the one or more potential weaknesses, output an image based on the image data and the second user input, the image highlighting the one or more individual objects, receive a third user input classifying the one or more individual objects as an actual weakness with respect to the first object detection model, and update the first object detection model based at least in part on the classification of the one or more individual objects as the actual weakness with respect to the first object detection model to generate a second object detection model for autonomous driving.

Example 2: the object detection model visual analysis system of Example 1, wherein the electronic processor is further configured to extract visual features based on the image data, and generate the coordinated visualizations based on the summary and the visual features that are extracted.

Example 3: the object detection model visual analysis system of Example 2, wherein the visual features include a feature type, a feature size, a feature texture, and a feature shape.

Example 4: the object detection model visual analysis system of any of Examples 1-3, wherein the coordinated visualizations include a size distribution visualization, an IoU distribution visualization, an Area Under Curve (AUC) visualization, a score distribution, and a class distribution.

Example 5: the object detection model visual analysis system of Example 4, wherein the first one or more user inputs include a size range input to the size distribution visualization and an IoU value range input to the IoU distribution visualization, and wherein the AUC visualization is based on the size range input and the IoU value range input.

Example 6: the object detection model visual analysis system of any of Examples 1-5, wherein one individual object of the one or more individual objects is one example of the one or more potential weaknesses of the first object detection model.

Example 7: the object detection model visual analysis system of any of Examples 1-6, wherein the object information includes detection results, scores, and Intersection over Union (IoU) values.

Example 8: a method for updating an object detection model for autonomous driving with an object detection model visual analysis platform, the method comprising: extracting, with an electronic processor and a first object detection model for autonomous driving, object information from image data; extracting, with the electronic processor, characteristics of objects from metadata associated with the image data; generating, with the electronic processor, a summary of the object information and the characteristics that are extracted; generating, with the electronic processor, coordinated visualizations based on the summary and the characteristics that are extracted; outputting, with the electronic processor, the coordinated visualizations for display on a display device; receiving, with the electronic processor, a first one or more user inputs from an interface device via a communication interface, the first one or more user inputs selecting a portion of information that is included in the coordinated visualizations; generating, with the electronic processor, a recommendation graphical user interface element based on the coordinated visualizations and the first one or more user inputs, the recommendation graphical user interface element summarizing one or more potential weaknesses of the first object detection model, outputting, with the electronic processor, the recommendation graphical user interface element for display on the display device; receiving, with the electronic processor, a second user input selecting one or more individual objects from the object information that is extracted and included in the one or more potential weaknesses; outputting, with the electronic processor, an image based on the image data and the second user input for display on the display device, the image highlighting the one or more individual objects, receiving, with the electronic processor, a third user input classifying the one or more individual objects as an actual weakness with respect to the first object detection model; and updating, with the electronic processor, the first object detection model based at least in part on the classification of the one or more individual objects as the actual weakness with respect to the first object detection model to generate a second object detection model for autonomous driving.

Example 9: the method of Example 8, further comprising: extracting visual features based on the image data; and generating the coordinated visualizations based on the summary and the visual features that are extracted.

Example 10: the method of Example 9, wherein the visual features include a feature type, a feature size, a feature texture, and a feature shape.

Example 11: the method of any of Examples 9 and 10, wherein the coordinated visualizations include a size distribution visualization, an IoU distribution visualization, an Area Under Curve (AUC) visualization, a score distribution, and a class distribution.

Example 12: the method of Example 11, wherein the first one or more user inputs include a size range input to the size distribution visualization and an IoU value range input to the IoU distribution visualization, and wherein the AUC visualization is based on the size range input and the IoU value range input.

Example 13: the method of any of Examples 8-12, wherein one individual object of the one or more individual objects is one example of the one or more potential weaknesses of the first object detection model.

Example 14: the method of any of Examples 8-13, wherein the object information includes detection results, scores, and Intersection over Union (IoU) values.

Example 15: a non-transitory computer-readable medium comprising instructions that, when executed by an electronic processor, causes the electronic processor to perform a set of operations comprising: extracting object information from image data with a first object detection model for autonomous driving; extracting characteristics of objects from metadata associated with the image data; generating a summary of the object information and the characteristics that are extracted; generating coordinated visualizations based on the summary and the characteristics that are extracted; outputting the coordinated visualizations for display on a display device; receiving a first one or more user inputs from an interface device via a communication interface, the first one or more user inputs selecting a portion of information that is included in the coordinated visualizations; generating a recommendation graphical user interface element based on the coordinated visualizations and the first one or more user inputs, the recommendation graphical user interface element summarizing one or more potential weaknesses of the first object detection model; outputting the recommendation graphical user interface element for display on the display device; receiving a second user input selecting one or more individual objects from the object information that is extracted and included in the one or more potential weaknesses; outputting an image based on the image data and the second user input for display on the display device, the image highlighting the one or more individual objects; receiving a third user input classifying the one or more individual objects as an actual weakness with respect to the first object detection model, and updating the first object detection model based at least in part on the classification of the one or more individual objects as the actual weakness with respect to the first object detection model to generate a second object detection model for autonomous driving.

Example 16: the non-transitory computer-readable medium of Example 15, wherein the set of operations further includes extracting visual features based on the image data; and generating the coordinated visualizations based on the summary and the visual features that are extracted.

Example 17: the non-transitory computer-readable medium of Examples 15 or 16, wherein the coordinated visualizations include a size distribution visualization, an IoU distribution visualization, an Area Under Curve (AUC) visualization, a score distribution, and a class distribution.

Example 18: the non-transitory computer-readable medium of Example 17, wherein the first one or more user inputs include a size range input to the size distribution visualization and an IoU value range input to the IoU distribution visualization, and wherein the AUC visualization is based on the size range input and the IoU value range input.

Example 19: the non-transitory computer-readable medium of any of Examples 15-18, wherein one individual object of the one or more individual objects is one example of the one or more potential weaknesses of the first object detection model.

Example 20: the non-transitory computer-readable medium of any of Examples 15-19, wherein the object information includes detection results, scores, and Intersection over Union (IoU) values.

Thus, the present disclosure provides, among other things, a visual analytics platform for updating object detection models in autonomous driving applications. Various features and advantages of the invention are set forth in the following claims.

What is claimed is:

1. An object detection model visual analysis system comprising:
   an interface device including a display device; and
   a computer including
   a communication interface configured to communicate with the interface device;
   a memory including an object detection model visual analysis platform and a first object detection model for autonomous driving; and
   an electronic processor communicatively connected to the memory, the electronic processor configured to
   extract object information from image data with the first object detection model,
   extract characteristics of objects from metadata associated with the image data,
   generate a summary of the object information and the characteristics that are extracted,
   generate coordinated visualizations based on the summary and the characteristics that are extracted,
   output the coordinated visualizations for display on the display device,
   receive a first one or more user inputs selecting a portion of information that is included in the coordinated visualizations,
   generate a recommendation graphical user interface element based on the coordinated visualizations and the first one or more user inputs, the recommendation graphical user interface element summarizing one or more potential weaknesses of the first object detection model, output the recommendation graphical user interface element for display on the display device,
receive a second user input selecting one or more individual objects from the object information that is extracted and included in the one or more potential weaknesses,
output an image based on the image data and the second user input, the image highlighting the one or more individual objects,
receive a third user input classifying the one or more individual objects as an actual weakness with respect to the first object detection model, and
update the first object detection model based at least in part on the classification of the one or more individual objects as the actual weakness with respect to the first object detection model to generate a second object detection model for autonomous driving.

2. The object detection model visual analysis system of claim 1, wherein the electronic processor is further configured to
extract visual features based on the image data, and
generate the coordinated visualizations based on the summary and the visual features that are extracted.

3. The object detection model visual analysis system of claim 2, wherein the visual features include a feature type, a feature size, a feature texture, and a feature shape.

4. The object detection model visual analysis system of claim 1, wherein the coordinated visualizations include a size distribution visualization, an IoU distribution visualization, an Area Under Curve (AUC) visualization, a score distribution, and a class distribution.

5. The object detection model visual analysis system of claim 4, wherein the first one or more user inputs include a size range input to the size distribution visualization and an IoU value range input to the IoU distribution visualization, and wherein the AUC visualization is based on the size range input and the IoU value range input.

6. The object detection model visual analysis system of claim 1, wherein one individual object of the one or more individual objects is one example of the one or more potential weaknesses of the first object detection model, and wherein the one or more potential weaknesses include one or more weaknesses from a group consisting of:
a potential false positive weakness,
a potential missing label weakness, and
a missed detected groups weakness.

7. The object detection model visual analysis system of claim 1, wherein the object information includes detection results, scores, and Intersection over Union (IoU) values.

8. A method for updating an object detection model for autonomous driving with an object detection model visual analysis platform, the method comprising:
extracting, with an electronic processor and a first object detection model for autonomous driving, object information from image data;
extracting, with the electronic processor, characteristics of objects from metadata associated with the image data;
generating, with the electronic processor, a summary of the object information and the characteristics that are extracted;
generating, with the electronic processor, coordinated visualizations based on the summary and the characteristics that are extracted;
outputting, with the electronic processor, the coordinated visualizations for display on a display device;
receiving, with the electronic processor, a first one or more user inputs from an interface device via a communication interface, the first one or more user inputs selecting a portion of information that is included in the coordinated visualizations;
generating, with the electronic processor, a recommendation graphical user interface element based on the coordinated visualizations and the first one or more user inputs, the recommendation graphical user interface element summarizing one or more potential weaknesses of the first object detection model;
outputting, with the electronic processor, the recommendation graphical user interface element for display on the display device;
receiving, with the electronic processor, a second user input selecting one or more individual objects from the object information that is extracted and included in the one or more potential weaknesses;
outputting, with the electronic processor, an image based on the image data and the second user input for display on the display device, the image highlighting the one or more individual objects;
receiving, with the electronic processor, a third user input classifying the one or more individual objects as an actual weakness with respect to the first object detection model; and
updating, with the electronic processor, the first object detection model based at least in part on the classification of the one or more individual objects as the actual weakness with respect to the first object detection model to generate a second object detection model for autonomous driving.

9. The method of claim 8, further comprising:
extracting visual features based on the image data; and
generating the coordinated visualizations based on the summary and the visual features that are extracted.

10. The method of claim 9, wherein the visual features include a feature type, a feature size, a feature texture, and a feature shape.

11. The method of claim 8, wherein the coordinated visualizations include a size distribution visualization, an IoU distribution visualization, an Area Under Curve (AUC) visualization, a score distribution, and a class distribution.

12. The method of claim 11, wherein the first one or more user inputs include a size range input to the size distribution visualization and an IoU value range input to the IoU distribution visualization, and wherein the AUC visualization is based on the size range input and the IoU value range input.

13. The method of claim 8, wherein one individual object of the one or more individual objects is one example of the one or more potential weaknesses of the first object detection model, and wherein the one or more potential weaknesses include one or more weaknesses from a group consisting of:
a potential false positive weakness,
a potential missing label weakness, and
a missed detected groups weakness.

14. The method of claim 8, wherein the object information includes detection results, scores, and Intersection over Union (IoU) values.

15. A non-transitory computer-readable medium comprising instructions that, when executed by an electronic processor, causes the electronic processor to perform a set of operations comprising:
extracting object information from image data with a first object detection model for autonomous driving;
extracting characteristics of objects from metadata associated with the image data;

generating a summary of the object information and the characteristics that are extracted;
    generating coordinated visualizations based on the summary and the characteristics that are extracted;
    outputting the coordinated visualizations for display on a display device;
    receiving a first one or more user inputs from an interface device via a communication interface, the first one or more user inputs selecting a portion of information that is included in the coordinated visualizations;
    generating a recommendation graphical user interface element based on the coordinated visualizations and the first one or more user inputs, the recommendation graphical user interface element summarizing one or more potential weaknesses of the first object detection model;
    outputting the recommendation graphical user interface element for display on the display device;
    receiving a second user input selecting one or more individual objects from the object information that is extracted and included in the one or more potential weaknesses;
    outputting an image based on the image data and the second user input for display on the display device, the image highlighting the one or more individual objects;
    receiving a third user input classifying the one or more individual objects as an actual weakness with respect to the first object detection model; and
    updating the first object detection model based at least in part on the classification of the one or more individual objects as the actual weakness with respect to the first object detection model to generate a second object detection model for autonomous driving.

16. The non-transitory computer-readable medium of claim 15, wherein the set of operations further includes
    extracting visual features based on the image data; and
    generating the coordinated visualizations based on the summary and the visual features that are extracted.

17. The non-transitory computer-readable medium of claim 15, wherein the coordinated visualizations include a size distribution visualization, an IoU distribution visualization, an Area Under Curve (AUC) visualization, a score distribution, and a class distribution.

18. The non-transitory computer-readable medium of claim 17, wherein the first one or more user inputs include a size range input to the size distribution visualization and an IoU value range input to the IoU distribution visualization, and wherein the AUC visualization is based on the size range input and the IoU value range input.

19. The non-transitory computer-readable medium of claim 15, wherein one individual object of the one or more individual objects is one example of the one or more potential weaknesses of the first object detection model, and wherein the one or more potential weaknesses include one or more weaknesses from a group consisting of:
    a potential false positive weakness,
    a potential missing label weakness, and
    a missed detected groups weakness.

20. The object detection model visual analysis system of claim 1, wherein the summarization of the recommendation graphical user interface element highlights a first one or more objects from the object information that are associated with the one or more potential weaknesses of the first object detection model and does not highlight a second one or more objects of the object information that are not associated with any potential weaknesses of the first object detection model.

* * * * *